(12) United States Patent
Aldrich et al.

(10) Patent No.: US 11,345,287 B2
(45) Date of Patent: May 31, 2022

(54) FLOOR DRAWERS

(71) Applicants: Lon L. Aldrich, West Lagrauge, IN (US); Andrea Graves, Kendallville, IN (US)

(72) Inventors: Lon L. Aldrich, West Lagrauge, IN (US); Andrea Graves, Kendallville, IN (US)

( * ) Notice: Subject to any disclaimer, the term of this patent is extended or adjusted under 35 U.S.C. 154(b) by 55 days.

(21) Appl. No.: 16/873,571

(22) Filed: May 7, 2020

(65) Prior Publication Data
US 2021/0347310 A1 Nov. 11, 2021

(51) Int. Cl.
*B60R 11/00* (2006.01)
*B60P 3/36* (2006.01)
*B60R 7/02* (2006.01)

(52) U.S. Cl.
CPC ............... *B60R 11/00* (2013.01); *B60P 3/36* (2013.01); *B60R 7/02* (2013.01); *B60R 2011/0029* (2013.01)

(58) Field of Classification Search
CPC ... B60R 11/00; B60R 7/02; B60R 2011/0029; B60P 3/36
USPC ........................................................ 296/37.1
See application file for complete search history.

(56) References Cited

U.S. PATENT DOCUMENTS

| | | | | |
|---|---|---|---|---|
| 3,406,999 A * | 10/1968 | Kozicki | ................... | B60P 3/36 296/156 |
| 4,941,797 A * | 7/1990 | Smillie, III | ............... | B60R 5/04 187/269 |
| 7,866,733 B2 * | 1/2011 | Smith | .................... | B60P 3/341 296/164 |
| 2004/0105744 A1 * | 6/2004 | Warner | .................... | B60R 5/04 414/522 |
| 2007/0007786 A1 * | 1/2007 | Doyle | .................... | B60R 11/06 296/37.1 |
| 2017/0151913 A1 * | 6/2017 | Granzotto | ............ | A47B 88/402 |

(Continued)

*Primary Examiner* — Pinel E Romain
(74) *Attorney, Agent, or Firm* — Ryan M Fountain

(57) ABSTRACT

A floor drawer is provided which is mounted so as to be below the floor when in the fully closed or storage position, and movable so as to be above the floor when in an accessible or open position. The floor drawer can be mounted to a support structure connected under the floor and then selectively slidable along a Lazy S track to emerge from the floor to rest on the floor, after a cover is opened. When in the closed position, the cover serves as an extension of the floor over the floor drawer opening. In vehicular applications, the support structure for the floor drawer is mounted between chassis beams or peripheral frame structure for the floor. The vertical component of the Lazy S track elevates the floor drawer over the vertical component of the chassis beam or frame structure, and the horizontal component of the Lazy S track guides the floor drawer toward or away from access doors to the vehicle exterior. In RV applications, the floor drawer can be mounted within exterior pass-through storage compartments, in removable or fixed configurations, without restricting the pass-through function of such storage compartments. The floor drawer can be ventilated to the vehicle exterior and/or be lockable to provide a secure and hidden storage area. The support structure for the floor drawer accommodates are variety of aesthetically pleasing floor drawer configurations.

16 Claims, 6 Drawing Sheets

(56) References Cited

U.S. PATENT DOCUMENTS

2019/0337457 A1\* 11/2019 Garrett .................... B60R 9/06
2020/0171996 A1\* 6/2020 Chevalier ................ B60P 3/34
2021/0206321 A1\* 7/2021 Setina .................... B60R 5/044

\* cited by examiner

FLOOR DRAWERS

BACKGROUND OF THE INVENTION

The present invention relates generally to drawers or storage compartments mounted beneath floors, and more particularly to floor drawers mounted in exterior pass-through storage compartments of recreational vehicles ("RVs"), such as travel trailers, toy haulers, fifth wheel trailers, motor homes, and the like, having at least living quarters therein, and as otherwise defined by the Recreational Vehicle Industry Association, information about which can be found on the internet at www.rvia.orq.

RVs are typically versatile vehicles which may be used for concurrently or separately hauling equipment, other vehicles, personal property, people, and animals. RVs are often used for camping and/or recreation, or as temporary living quarters for an extended period of time. As such, the removable contents of an RV can include camping equipment, other vehicles (such as golf carts, ATVs, race cars, dune buggies) and tools therefor, chairs, tables, tents, bar-b-ques, small boats, swimming toys and accessories, ski and snowboard gear, etc. Since RVs are typically all-weather vehicles, the items stored in, used with, and/or transported by the RV are typically exposed to a variety of environmental conditions, (including, rain, snow, and ice) as well as exterior wear and tear, soiling and staining. Obviously, it may not always be possible to immediately clean, dry, and/or repair such items between usage and storage. Accordingly, it can be desirable to store certain items separately from within the living quarters of the RV, and even to separate certain stored items which are kept out of the living quarters. Also, it can be desirable to have a secure and hidden storage area for certain items to be stored in or transported by the RV.

At the same time, RVs are typically limited in size, both as a matter of purchaser economics, drivability or towability limitations, fuel economy, and because of various governmental usage regulations. Thus, there is not an unlimited possibility for increased storage space when constructing an RV. Accordingly, RV construction should usually be as efficient as possible, so as to maximize both the volume utilizable storage space within the vehicle and the ease of using that space.

In that regard, it has been found desirable to create various storage compartments within RVs which are accessible from the exterior of the RV, rather than from its interior living quarters. In order to increase the utility of these exterior storage compartments, it has been found to be especially desirable to form these as "pass-through" storage compartments when possible, meaning that there are doors or openings on each lateral side of the RV which are aligned to allow access to the same compartment from opposing lateral sides of the RV, although the lateral openings themselves do not necessarily have a common axis or dimension. These pass-through compartments typically have a flat floor extending between each lateral opening, so that stored items can be readily slid from one side of the RV to the other, facilitating removal of the stored items from either side of the RV, as convenience dictates in a given situation.

On occasion, construction and features found in static structures, such as residential buildings, have been incorporated within RVs. Indeed, some of the cosmetic and interior convenience features, as well as the general appeal of an RV, suggest that it is a "home away from home." However, vehicular applications of general building techniques are often difficult or inappropriate, particularly for RVs. In general, RV's and their structural features need to be not merely robust enough to travel at hurricane or tornado-like speeds over highways, but also to endure the differential vertical forces applied over a significant vehicle length for substantial off-road movement to and from camping areas.

In that regard, RVs are typically constructed on a vehicular chassis or frame structure having at least two primary beams, spaced apart and extending along at least most of the longitudinal length of the RV. These beams can be of square, rectangular, I, C, or L cross section, as appropriate in a given instance according to load bearing needs, costs, etc. for a given vehicle size and style. The floor structure of the RV is typically built on top of these beams, and the suspension system and wheels are typically attached under these beams.

"Floor drawers" have previously been suggested in certain applications as a means of increasing storage area, particularly in residential buildings. In general, these structures have been formed to slide horizontally with respect to a floor, between storage and access positions, such as under a bed and along the top of the supporting floor. Also, some drawer structures have been suggested for vehicular use under a horizontal support surface. However, applying those structures to pass-through compartments for RVs has not been suitable in many instances, at least because:

a. mounting floor drawers on top of the floor of the pass-through storage compartment reduces the usable space in that compartment and/or limits compartment versatility;
 b. the chassis beams or RV frame under the pass-through compartment severely limit drawer size and/or block horizontal movement of the floor drawers, unless the drawers are mounted under the chassis beams or frame structure, but doing so would either limit ground clearance or increase the overall height of the RV or limit the interior height of the RV within the living quarters;
 c. floor drawers typically include a vertical elevation structure which would limit slidability of objects between the lateral sides of the RV, and inhibit users access to those objects from a side opposite to where the object was initially placed; and
 d. prior floor drawer arrangements can inhibit maintenance and repair access to RV structure.

OBJECTIVES OF THE INVENTION

Accordingly, a primary objective of the invention is to provide improved floor drawers for supplemental storage capacity. These improvements include providing such arrangements which:

a. are inexpensive to manufacture, install, maintain, and repair,
 b. increase floor plan optimization when used in a vehicle, such as an RV,
 c. minimize component weight,
 d. increase storage area and accessibility thereto,
 e. increase supplemental feature accessibility and user comfort, and
 f. increase the aesthetic appeal of RVs.

SUMMARY OF THE INVENTION

These and other objectives of the present invention are achieved by the provision of a floor drawer which is mounted so as to be below the floor when in the fully closed or storage position, and movable so as to be above the floor when in an accessible or open position. The floor drawer can be mounted to a support structure connected under the floor and then selectively slidable along a Lazy S track to emerge from the floor to rest on the floor, after a cover is opened. When in the closed position, the cover serves as an extension of the floor over the floor drawer opening. In vehicular applications, the support structure for the floor drawer is mounted between chassis beams or peripheral frame structure for the floor. The vertical component of the Lazy S track elevates the floor drawer over the vertical component of the chassis beam or frame structure, and the horizontal component of the Lazy S track guides the floor drawer toward or away from access doors to the vehicle exterior. In RV applications, the floor drawer can be mounted within exterior pass-through storage compartments, in removable or fixed configurations, without restricting the pass-through function of such storage compartments. The floor drawer can be ventilated to the vehicle exterior and/or be lockable to provide a secure and hidden storage area. The support structure for the floor drawer accommodates are variety of aesthetically pleasing floor drawer configurations.

Other objects, advantages, and novel features of the present invention will become readily apparent from the following drawings and detailed description of certain preferred and alternative embodiments.

DETAILED DESCRIPTION OF PREFERRED EMBODIMENTS

Figure 1:
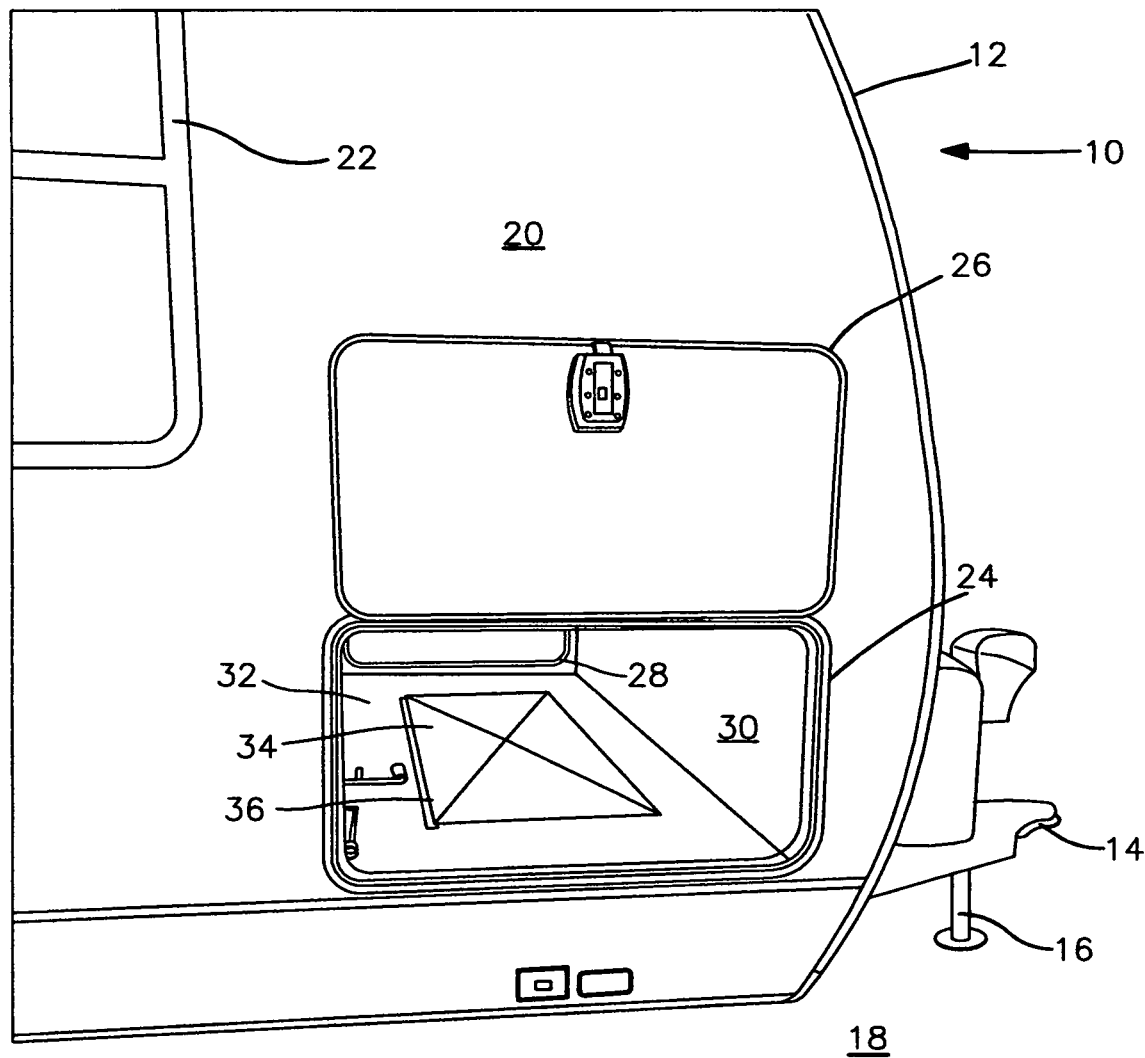
FIG. 1 shows a side view of a preferred embodiment of the present invention in the closed storage position, as applied to the pass-through storage compartment at the front end of a travel trailer.

The figures show schematically, and in a best mode version, embodiments of the present invention, as applied to a travel trailer type of RV, both generically and specifically. The drawings are not to scale from one view to the next.

The following features are illustrated in the drawings by these numerals:

10. Travel trailer type RV
12. Front end wall of the travel trailer,
14. Hitch extension or tongue of the travel trailer chassis or frame,
16. Tongue jack,
18. Ground (upon which the RV rests),
20. Right side wall of the travel trailer,
21. Left side wall of the travel trailer,
22. Side window to travel trailer interior living quarters,
24. Right side opening to the storage compartment,
26. Door for the right side opening,
28. Left side opening for the storage compartment,
30. Pass-through storage compartment,
32. Floor of the storage compartment,
34. Cover for the floor drawer,
36. Hinge connection for the cover, attached to floor 32,
38. Grip or handle for manipulating the cover,
40. Floor drawer,
42. Guide members or slide structure,
44. Fasteners for attaching the support structure to the floor,
45. Recesses or openings for receiving the fasteners,
46. Support structure,
48. Exemplary item for storage,
50. Roller bearing,
52. Bearing pin or axle,
54. Chassis beam or frame structure for travel trailer,
56. Floor support,
58. Rear guide stop,
60. Forward guide stop,
62. Roller flange,
64. Drive motor, and
66. Worm gear drive rod.

In general, the directions of motion referred to below are with reference to a generally horizontal ground 18 upon which the RV application is resting. Preferably, floor 32 is horizontal (or nearly so) in that situation. Obviously, variations in the orientation of floor 32 will have corresponding variations in the orientation of the floor drawer arrangement of the present invention. Reference herein to "lateral" orientations are with respect to the lateral or side to side dimension of the RV, rather than to its "longitudinal" or front to back dimension along the usual direction of RV travel.

In the embodiments shown, floor drawer 40 is movable between two positions:
  a storage position where the floor drawer is fully contained within support structure 46 and away from right side opening 24, and
  an open position where the floor drawer is fully extended from support structure 46 toward right side opening 24.

In general, when the floor drawer is fully contained within the support structure, items 48 are not as easily accessible by the user. When the floor drawer is slid out from the support structure, items 48 are more easily accessible by the user, particularly if the user remains outside of the right side opening of the RV. Thus, open positions of the floor drawer are referred to as "access positions." As needed by the user, floor drawer 40 can be moved to any desired position therebetween, along guide members 42.

For clarity of view, only one exemplary roller bearing 50 is shown in the drawings, but it should be understood that in preferred embodiments, the two bearing pins 52 on roller flange 62 also have roller bearings mounted thereon, and that bearing pins 52 (each with an associated roller bearing) are mounted on both sides of the floor drawer. The roller bearing illustrated in FIG. 3, along with the corresponding roller bearing on the other side of floor drawer 40 at the side of floor drawer 40 containing grip 38, are disposed to leave guide members 42 and roll over floor 32 when floor drawer 40 is extended toward the right side opening. However, the roller bearing beneath roller flange 62 are preferably always retained within the guide members, as a result of forward guide stops 60, which can, for example, be a mere downward flange blocking movement of the associated roller bearing.

In alternative preferred embodiments, the guide members and associated roller bearings can use a structure which allows the floor drawer to be fully removed from the guide members by, for example, vertical manipulation when the floor drawer is fully extended, in much the same way as a conventional cabinet drawer can be fully removed from a cabinet.

In the illustrated embodiments, guide members 42 have a "Lazy S" cross-sectional shape, which is defined as one which allows roller bearings 50 to move from rear guide stops 58 rightward (in the view of FIG. 6) along a horizontal path, and then upward along an inclined path, and then along another horizontal path until forward guide stop 60 prevents further rightward movement. In other preferred embodiments, the initial horizontal path of guide members can be extended or removed, as desired in a given application. Also, the slope of the inclined portion of the guide members can be selected from a range of shapes, as desired in a given application. In general, a more gentle slope will allow the floor drawer 40 to be more easily moved out of support structure 46 when it container heavier loads, but that will also typically require that the right slide of the floor drawer have a shallower bottom as it inclines toward grip 38 (thus limiting the total volume of storage space within the floor drawer).

To ease the burden of moving floor drawer 40 and its contents manually via grip 38, certain embodiments of the present invention can include motorized actuation devices. Suitable arrangements for that purpose can include worm gear drive rod 66 connected to drive motor 64 and be selectively actuated by the user through conventional controls. Alternatively, various chain drive, cable drive, and hydraulic or pneumatic struts or other actuation devices of a conventional nature can be applied to the present invention for this purpose, as desired by the user.

Depending upon the dimensions of the floor drawer and the guide members, the floor drawer can, at least in part, be extended out through the right side opening to the exterior of the RV. In such embodiments, the floor drawer contents not only become more easily accessible, but the floor drawer can also serve as a table or work surface. In such embodiments, the portion of the floor drawer extending out of the right side opening can employ a cantilevered connection to the RV or, supplementally, can be formed to include fold down or attachable legs to engage ground 18 or another portion of RV 10. Further, certain embodiments of such floor drawers 40 can be formed to include special usage features, such as a work bench, fish cleaning station, exterior kitchen, or bar-b-que grill. Having these usage features containable within a fully removable floor drawer can make cleaning and maintenance easier for the user. Further, if the floor drawer is fully removable, it can be used to contain interchangeable utility modules for specific purposes, thus allowing greater flexibility in alternative RV use and functionality, especially overtime. Even if the floor drawer is not fully removable, allowing the special usage features to be fully contained within a floor drawer arrangement can prevent unwanted contact with other items being maintained within storage compartment 30.

In the embodiments illustrated, support structure 46 is shown to have a relatively small lip or flange on its upper edge, which contains a plurality of recesses 45, about the circumference of the support structure. This arrangement permits conventional fasteners 44 to secure the support structure to the upper surface of floor 32, with minimal elevation above floor 32. Thus, even when cover 34 is in place over floor drawer 40, there is minimal obstruction to sliding items between openings 24 and 28 within storage compartment 30, as the user may desire for ease of use and removal of those items.

However, in other preferred embodiments, support structure 46 can be attached by conventional fasteners, welds, or the like to floor support 56, completely under floor 32. In those embodiments, if necessary, the vertical dimension of roller flange 62 can be extended to ensure adequate room to the floor drawer to emerge from support structure 46 and slide over floor 32 toward access positions. Thus, when cover 34 is in place over floor drawer 40, and especially when cover 34 is hinged to support structure 46 or floor drawer 40, rather than hinged to floor 32, the floor drawer arrangement can be completely flush with (and even slightly recessed with respect to) the surface of floor 32. Similarly, obstruction to side to side movement of items within storage compartment 30 between openings 24 and 28 can be avoided by embodiments of the present invention where cover 34 is removably connected to directly floor drawer 40 by an interference fit, spring latches or other conventional arrangements, rather than by direct connection to the storage compartment or floor 32.

In addition, in certain embodiments of the present invention, cover 34 can be adapted to be completely removable from compartment 32 itself (rather than from floor drawer 40), rather than hinged to either the support structure or the floor drawer. Also, while in FIGS. 1 and 2, cover 34 is shown to have a grip slot or opening similar to grip 38, in order to facilitate manipulation of cover 34, it will be readily understood that various other handles or manipulation structures can be used instead.

Figure 2:
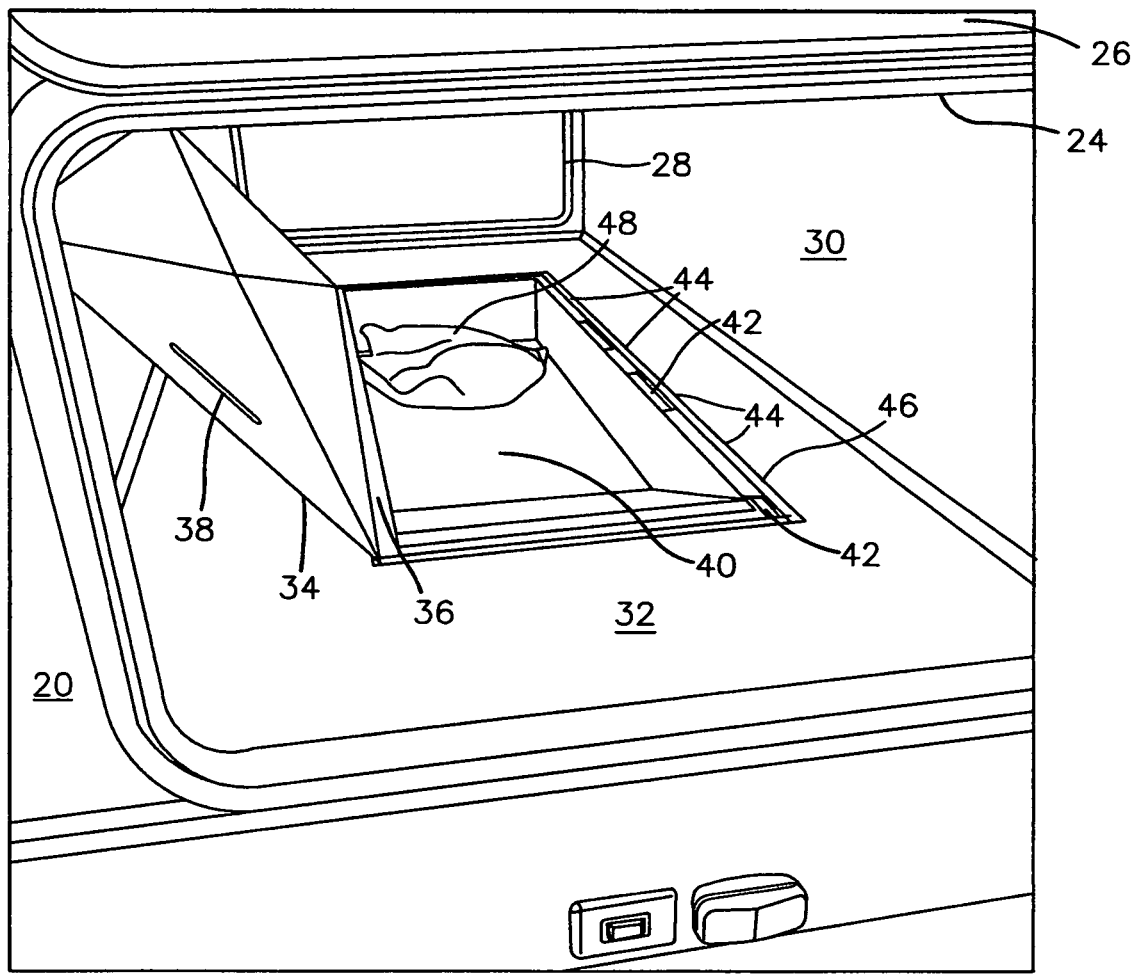
FIG. 2 shows an enlarged side view of the embodiment and application of FIG. 1 in an open storage position.
Figure 3:
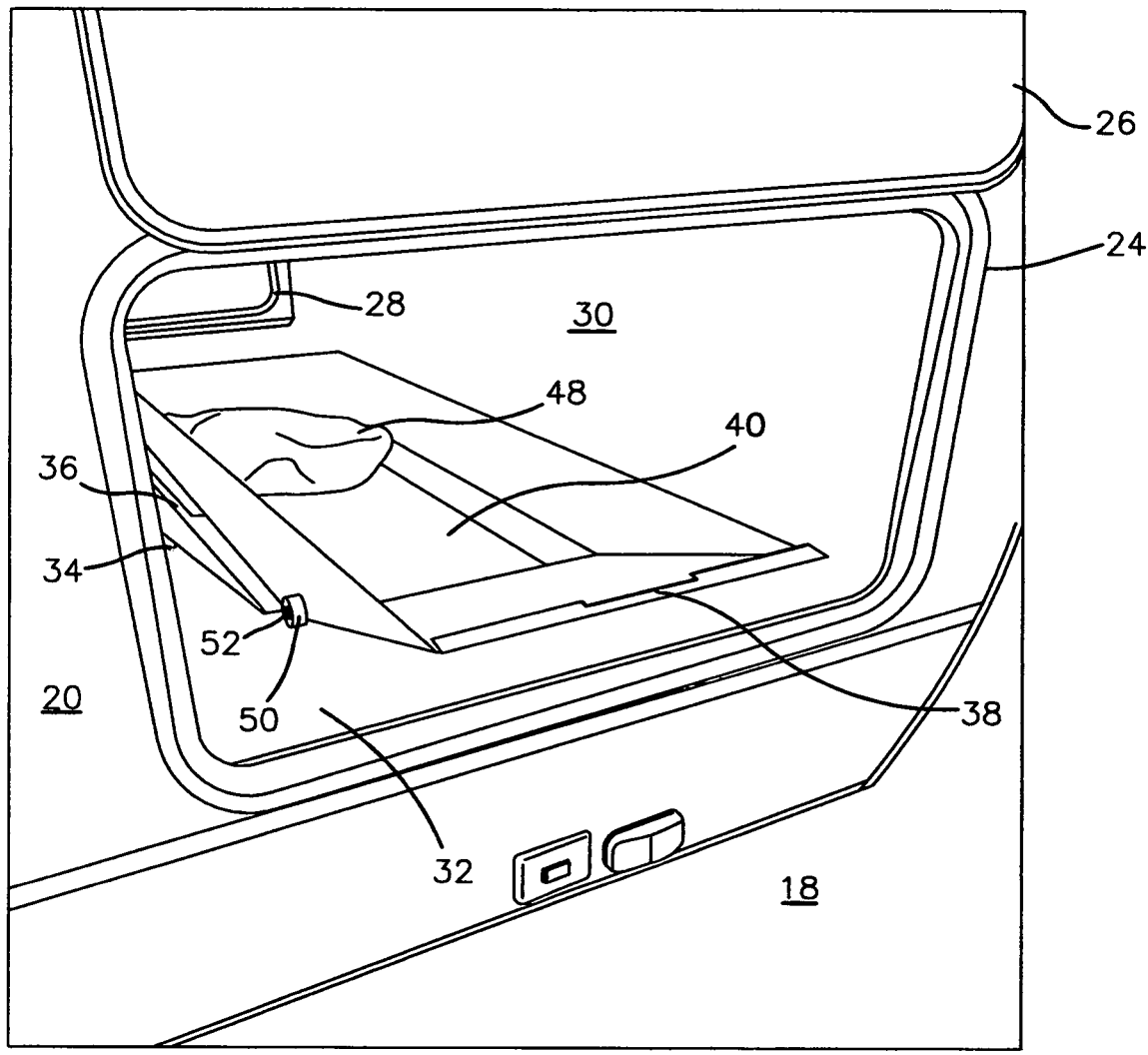
FIG. 3 shows an enlarged side view of the embodiment and application of FIG. 1 in an open and accessible position.
Figure 4:
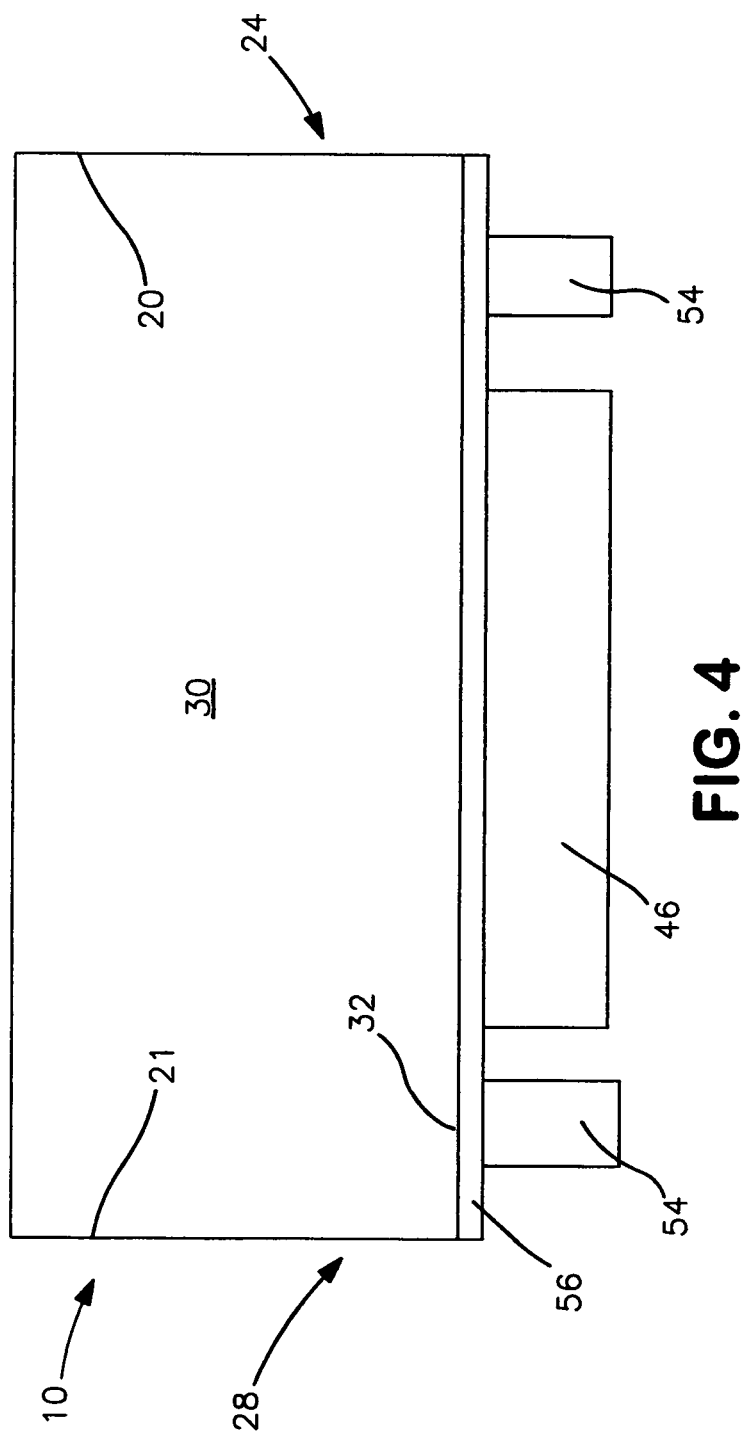
FIG. 4 shows a schematic, cross-sectional view of the forward portion of a RV from side to side through the pass-though storage compartment at the median of the side openings, having the present invention mounted therein in the closed storage position.

As illustrated in FIGS. 1-3, the aesthetic appearance of storage compartment 30 has been enhanced by surface ornamentation which resembles that typically found in the living compartment of the RV. This includes "floor tiling" and "wall paper" appearances. In preferred embodiments of the present invention, the floor drawer arrangement is designed to have a complementary aesthetic appearance to the decor of the storage compartment, as shown in FIGS. 1-3. In other embodiments, cover 32 may be formed to have an appearance which blends into the surface ornamentation of the floor, especially where the floor drawer arrangement is intended to be more concealed.

Concealment of the floor drawer arrangement can be desirable in embodiments of the present invention where the floor drawer is intended for secure storage. In such applications, grip 38 can, for example, include a locking device of a conventional nature to selectively retain cover 34 to the floor drawer, and restrict unauthorized access. Such applications can be adapted to be sufficient for transport of firearms and/or ammunition, especially within governmental jurisdictions which require secure and/or remote storage of those items, when the RV is used for recreational hunting. In other applications, such secure storage areas can provide users with temporary safety for valuables when traveling. When used for secure storage, support structure 46 can be formed with an enclosed, integral bottom panel (rather than use merely a perimeter frame, such as that shown in FIG. 6), which restricts access to floor drawer 40 from beneath the RV.

The present invention encompasses other applications where the floor drawer is used for ventilation and/or drying of items contained therein. For example, if wet items (resulting, for example, from water sports, swimming, rain or snow) are to be placed for storage within floor drawer floor, the surface of the floor drawer can be formed with perforations or openings of applicable size so as to allow sufficient airflow from the exterior of the RV. This airflow can be used to facilitate drying or reduce the formation of mold and/or mildew on the items therein. In such applications, support structure 46 may not need to have a bottom panel, and can be formed as merely a perimeter or frame about floor drawer 40.

Further, the present invention contemplates use of floor drawer 40 to provide close containment of various loose items, such as tools and the like, so that those items can be readily located within the storage compartment when needed. Thus, those otherwise loose items are not free to slide about and migrate (particularly when the RV is being transported) to difficult to reach corners of the storage compartment or become entangled with other items in the storage compartment. In such applications, floor drawer 40 can also be formed with retaining clips and/or conventional foam forms to secure and protect such tools and the like.

Figure 5:
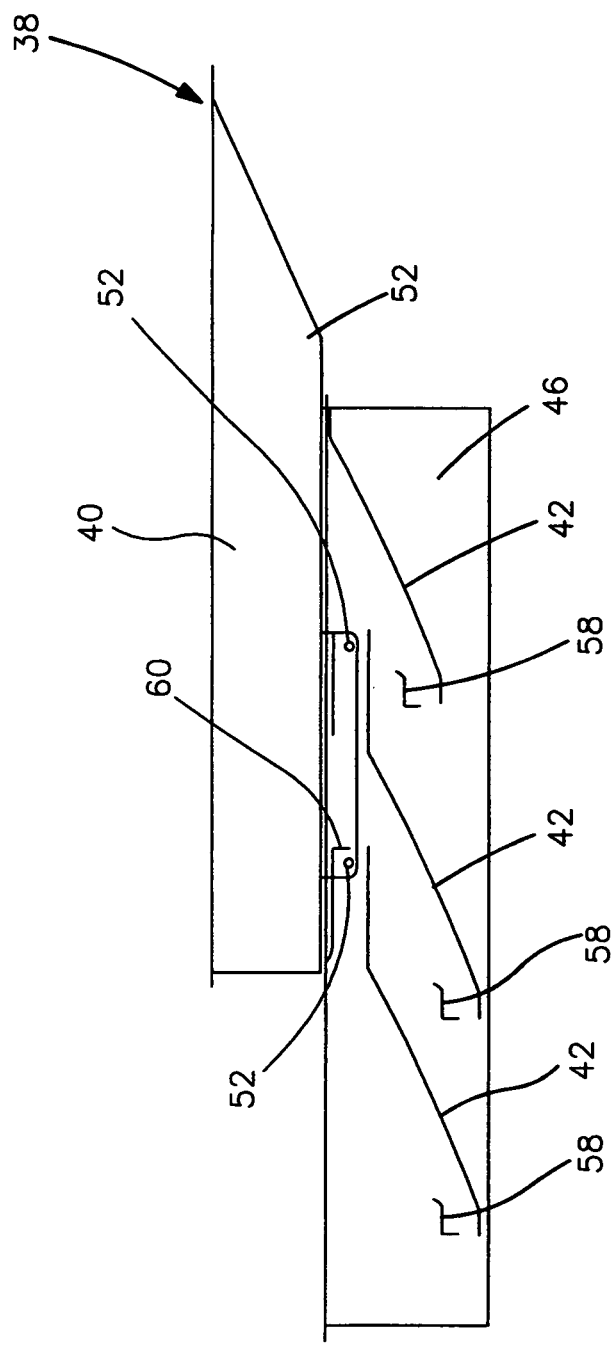
FIG. 5 shows a cross-sectional view of a preferred embodiment of the present invention as seen from side to side orientation of FIG. 4, in an open accessible position.
Figure 6:
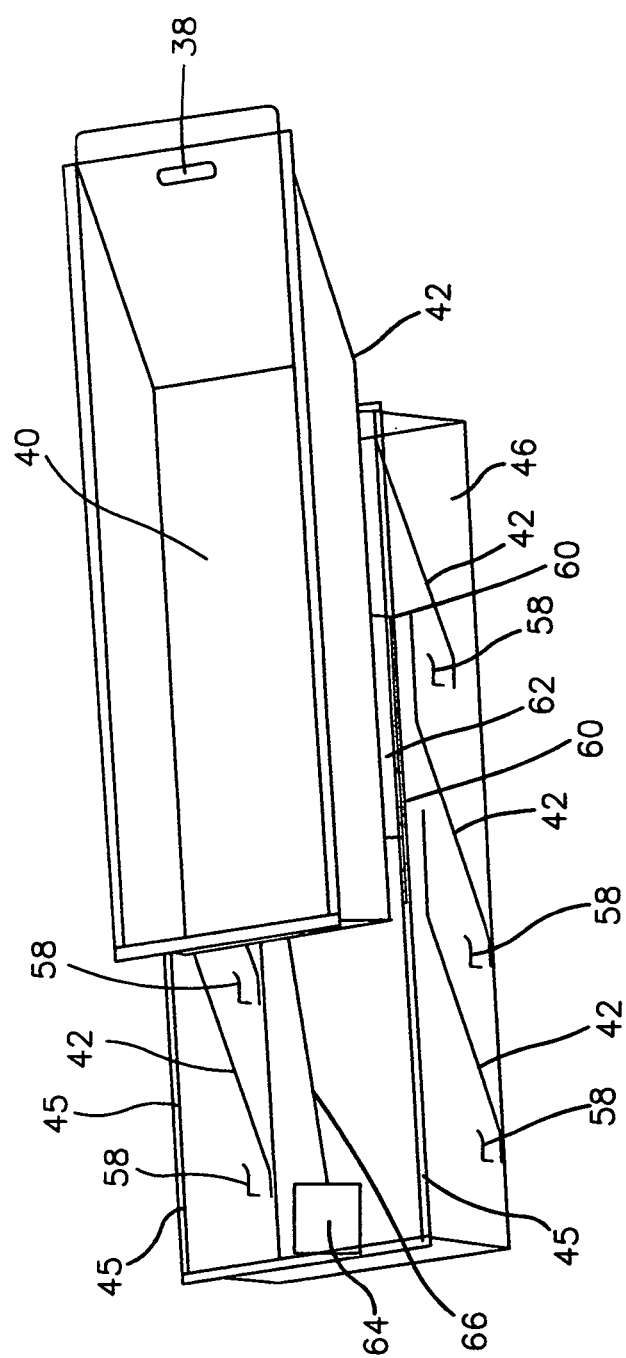
FIG. 6 shows an upper left, rear perspective view of the embodiment of FIG. 5 in the same position, with the guide members and drawer drive illustrated schematically.

Guide members 42 are illustrated in FIGS. 5 and 6 as being mounted on each inner, lateral side of support structure 46. However, the present invention contemplates use of various alternative guide members. For example, a singular, central guide could be used under floor drawer 40, rather than at its sides. In such arrangements, a single roller bearing could be mounted under the middle front area of floor drawer 40 to engage floor 32, instead of the two roller bearings established by FIG. 3. In general, there are a number of conventional drawer slide mechanisms which can be adapted for use in the present invention, provided that they can guide the drawer not merely in the conventional horizontal motion, but also in a vertical dimension sufficient to lift the floor drawer from a recessed position, at least partially beneath floor 32, to a position where is can rest upon or substantially above floor 32.

Although the present invention has been shown and described herein with respect to certain preferred embodiments and alternative configurations, those were by way of illustration and example only. For example, while the present invention shows the floor drawer being movable with respect to access through only right side opening 24 of RV 10, the floor drawer arrangement can not only be laterally reversed toward left side opening 28, it can be adapted to be movable in both directions. This can be accomplished by, for example, mounting two floor drawers back to back, or using a single floor drawer with alteration of rear guide stops 58 and mirror imaging the ends of the floor drawer 40 to have upward inclines at each end. Alternatively, a plurality of floor drawers can be vertically stacked under floor 32 and oriented to opposing motion toward access positions.

Further, the present invention has been illustrated in a RV application, but it can be readily adapted to use in other vehicles where dimensional and other structural constraints limit use of drawers having only horizontal access motion. Similarly, the present invention can be adapted for use in static structures where floor joists, framing beams and the like provide otherwise unusable space within the building.

Accordingly, the spirit and scope of the present invention is intended to be limited only by the terms of the appended claims.

What is claimed is:

1. A floor drawer mounted with respect to a floor such that the floor drawer is beneath the floor in the fully closed position and the floor drawer is above the floor in an open position; wherein the floor is supported by at least two beam members located beneath the floor, and the floor drawer is disposed between those beam members when the floor drawer is in the storage position.

2. A floor drawer arrangement, connected to a support surface or floor of a storage compartment, having:
    a floor drawer member, adapted to support items to be stored,
    a support structure connected to the floor drawer to retain the floor drawer in a storage position located beneath the floor,
    a slide structure connected to the support structure to allow the floor drawer to be slid from the storage position to an access position located above the floor.

3. The floor drawer arrangement according to claim 2 wherein a cover is provided to selectively close floor drawer and provide a further support surface for the storage compartment.

4. The floor drawer arrangement according to claim 3 wherein the cover is hinge mounted so as to be substantially flush with the floor when the cover closes the floor drawer.

5. The floor drawer arrangement according to claim 4 wherein the cover is hinge mounted to the floor.

6. The floor drawer arrangement according to claim 4 wherein the cover is hinge mounted to the floor drawer.

7. The floor drawer arrangement according to claim 2 wherein the slide structure includes guide members which direct the floor drawer to horizontal motion for at least part of the drawer motion between the storage position and an access position.

8. The floor drawer arrangement according to claim 2 wherein the slide structure includes guide members which direct the floor drawer to motion on the floor when the floor drawer is in an access position.

9. The floor drawer arrangement according to claim 8 wherein the floor drawer and the guide members are adapted to allow at least a portion of the floor drawer to extend outward of the storage compartment when the floor drawer is in an access position.

10. The floor drawer arrangement according to claim 9 wherein the guide members are adapted to allow the floor drawer to be removably attached thereto, to permit removal of the floor drawer from the storage compartment.

11. The floor drawer arrangement according to claim 2 wherein an actuator is connected to the floor drawer to selectively impart motion to the floor drawer to cause the floor drawer to move between the storage position and an access position.

12. The floor drawer arrangement according to claim 2 wherein the storage compartment formed within a vehicle, and the floor is substantially horizontal.

13. The floor drawer arrangement according to claim 12 wherein the floor is supported by at least two beam members located beneath the floor, and the floor drawer is disposed between those beam members when the floor drawer is in the storage position.

14. The floor drawer arrangement according to claim 12 wherein the floor drawer includes ventilation openings therein to allow air flow to the contents of the floor drawer, and the support structure includes an opening therein to allow air flow from the exterior of the vehicle to access to ventilation openings of the floor drawer.

15. The floor drawer arrangement according to claim 12, wherein:
    the vehicle is a recreational vehicle having a chassis formed from at least two longitudinally extending beams,
    the storage compartment is formed with aligned pass-through openings at each lateral side,
    the floor drawer is aligned for movement toward at least one of those pass-through openings, and
    the support structure is mounted to the vehicle such that the floor drawer is disposed between the longitudinally extending beams when the floor drawer is in the storage position.

16. The floor drawer arrangement according to claim 2 wherein a security locking device is attached to the floor drawing to preclude unauthorized access to any contents of the floor drawer.

\* \* \* \* \*